Patented May 8, 1951

2,552,026

UNITED STATES PATENT OFFICE 2,552,026

PRODUCTION OF AMINO NITRILES BY AMMONOLYSIS OF CHLORO NITRILES

Oscar W. Bauer and John W. Teter, Chicago, Ill., assignors to Sinclair Refining Company, New York, N. Y., a corporation of Maine No Drawing. Application August 10, 1945, Serial No. 610,188

2 Claims. (Cl. 260—465.5)

This invention relates to improvements in the production of aminonitriles, which are useful for the production of amino acids, amino esters, diamines, and other products.

The aminonitriles which may be prepared in accordance with the present invention are the monoaminonitriles which may be represented by the general formula $$R(NH_2)-C{\equiv}N$$

in which R is an alkyl group having from 1 to 11 carbon atoms and substituted by the amino group which may be in the omega position or may be linked to a secondary carbon atom in the alkyl group. The invention is of particular importance as applied to the production of the aminonitriles having a total of 2 to 5 carbon atoms including glycinonitrile, 2 and 3-monoaminopropionitriles, 2, 3 and 4-monoaminobutyronitriles and the various isomeric monoaminovaleronitriles.

In accordance with the present invention, these aminonitriles are prepared by the reaction of aqueous ammonia with the corresponding monochloronitrile. Room temperatures are conveniently used, although somewhat higher temperatures, for example, up to 40° C. or somewhat higher may be used as may lower temperatures. Ammonium chloride is a by-product of the reaction and the ammonium hydroxide should therefore be used in excess sufficient to provide that required for the primary reaction and that required to neutralize the hydrogen chloride formed. In general it is advantageous to use a substantial excess of ammonium hydroxide. Organic solvents are not used or included in the reaction mixture.

The invention will be illustrated by the following examples but it is not limited thereto.

*Example 1.*—To 27 parts of concentrated ammonia were slowly added 15.1 parts of monochloracetonitrile with stirring. Ammonia gas was bubbled into the mixture until the 2 layers disappeared. The excess ammonia was then evaporated under vacuum and the solution neutralized with the theoretical amount of concentrated hydrochloric acid. After vacuum evaporation to dryness the residue was extracted with alcohol, and from the resulting solution, glycinonitrile hydrochloride was recovered in 38% yield.

*Example 2.*—200 parts of concentrated aqueous ammonia was placed in a vessel provided with a stirrer, dropping funnel and gas inlet. Gaseous ammonia was passed into the vessel, and then 104 parts of 3-chlorobutyronitrile were slowly introduced with stirring. After the addition of the nitrile, stirring was continued for 4 to 5 hours. The reaction mixture was then evaporated under vacuum almost to dryness, and concentrated hydrochloric acid was added until the mixture was acid to Congo red. The solution was then evaporated under vacuum, the dry residue extracted with alcohol and the hydrochloride separated from the resulting alcoholic solution. It was obtained in a yield of over 60%. 3-chloropropionitrile similarly treated, gave 3-aminopropionitrile in yields in excess of 70%.

The process is of advantage for producing, among others, from the corresponding chloronitriles, the following aminonitriles:

2-aminopropionitrile.
3-aminopropionitrile.
2-aminobutyronitrile.
3-aminobutyronitrile.
4-aminobutyronitrile.
2-aminoisobutyronitrile.
2-aminovaleronitrile.
3-aminovaleronitrile.

and other monoaminonitriles having a total of from 2 to 12 carbon atoms.

We claim:

1. Process of producing compounds of the formula $$R(NH_2)-C{\equiv}N$$

in which R is an alkyl group having from 1 to 11 carbon atoms, said compounds being selected from the group consisting of those in which the amino group is in the omega position and those in which it is linked to a secondary carbon atom in the alkyl group, which comprises reacting the corresponding monochloroalkylnitrile with aqueous ammonia in the absence of an organic solvent.

2. Process of producing compounds of the formula $$R(NH_2)-C{\equiv}N$$

in which R is an alkyl group having from 1 to 4 carbon atoms, said compounds being selected from the group consisting of those in which the amino group is in the omega position and those in which it is linked to a secondary carbon atom in the alkyl group, which comprises reacting the corresponding monochloroalkylnitrile with aqueous ammonia in the absence of an organic solvent.

OSCAR W. BAUER.
JOHN W. TETER.

(References on following page)

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,109,929 | Rigby | Mar. 1, 1938 |
| 2,163,594 | Engels et al. | June 27, 1939 |
| 2,195,974 | Reppe et al. | Apr. 2, 1940 |
| 2,225,155 | Cheronis | Dec. 17, 1940 |
| 2,298,739 | Lichty et al. | Oct. 13, 1942 |
| 2,364,538 | Kirk | Dec. 5, 1944 |

FOREIGN PATENTS

| Number | Country | Date |
|---|---|---|
| 511,841 | Great Britain | Aug. 25, 1939 |

OTHER REFERENCES

Keil: Chem. Abst., vol. 22, p. 385 (1928).

Whitmore et al.: Jour. Am. Chem. Soc., vol. 66 (1944) pp. 725–731.